Oct. 20, 1931.   C. BREER   1,828,278
DAMPENER
Filed May 12, 1926

INVENTOR
CARL BREER.
BY
ATTORNEY

Patented Oct. 20, 1931

1,828,278

UNITED STATES PATENT OFFICE

CARL BREER, OF DETROIT, MICHIGAN, ASSIGNOR TO CHRYSLER CORPORATION, OF HIGHLAND PARK, MICHIGAN, A CORPORATION OF DELAWARE

DAMPENER

Application filed May 12, 1926. Serial No. 108,516.

It is the primary object of my invention to provide a dampener in a motor vehicle to subdue or eliminate body vibrations caused by torque re-action and other motor vibrations or impulses.

Another object of my invention is to interpose friction between the internal combustion engine and an automobile body to dampen periodic vibrations of the body caused by synchronization of the body and other parts with the engine impulses.

With the above and other objects in view, my invention consists in the arrangement, combination and construction of the various parts of my improved device, as described in the specification, claimed in my claims and shown in the accompanying drawings, in which:

Figure 1:
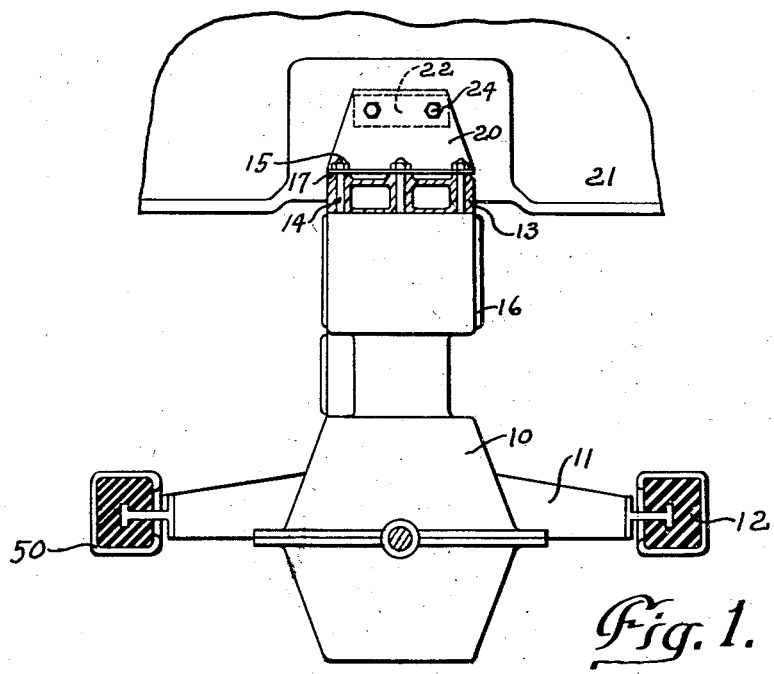
Fig. 1 is a front view, shown partly in elevation and partly in section, of an internal combustion engine with my improved device attached thereto positioned in front of a portion of the body dash, shown in elevation.
Figure 2:
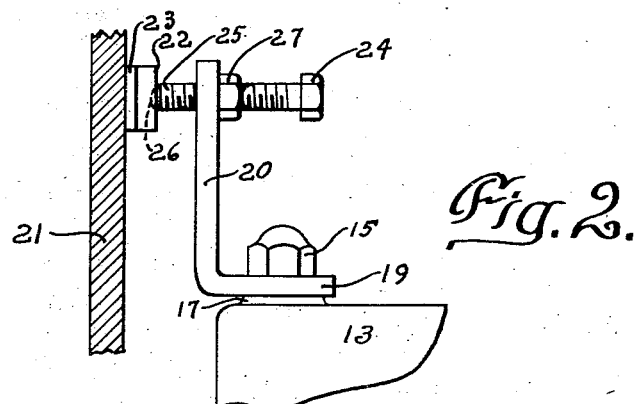
Fig. 2 is a side elevation of my improved device attached to the head of the internal combustion engine and bearing against a portion of a body dash shown in section.

I have shown a conventional internal combustion engine 10 mounted by arms 11 in rubber blocks 12, such for instance, as those shown in Patent No. 1,578,673, issued March 30th, 1926. The engine 10 is provided with a cylinder head 13 secured by studs 14 and nuts 15 to a cylinder block 16. Bosses 17 are cast on the top of the head 13 through which the studs 14 pass.

Positioned on and secured to the bosses 17 at the rear of the head 13 by the studs 14 and nuts 15 is my improved device, in the construction of which I provide an angle plate 19 having a vertical side 20 extending up from the head 13 and parallel with a conventional dash 21 of an automobile body, not shown.

A plate 22 having a friction lining 23 bearing against the dash 21 is positioned by bolts 24 threaded through the side 20 of the angle plate 19. The ends 25 of the bolts 24 are placed in seats 26 cut into the plate 22. Lock nuts 27 that bear against the side 20 of the angle plate 19 prevent the bolts 24 from accidentally turning.

In the practical operation of my improved device the engine 10 being mounted in rubber blocks 12 will move under the impulse of explosions. This vibratory movement will be conveyed through the angle plate 19 and bolts 24 to plate 22 and lining 23. The lining 23 being held against the dash 21 by the bolts 24 tends to move back and forth. Thus the friction of the lining 23 against the dash 21 will prevent the impulses of the engine from being transferred as synchronous vibration to the body. The pressure of the lining against the dash 21 may be varied by adjusting the nuts 27, the side 20 of the angle plate 19 being held under tension.

It will be noted that the angle shape of the plate 19 admirably adapts the device to dampen both vertical and sidewise vibrations, because the width of the side 20 is sufficient to lend rigidity thereto in sidewise direction, and the height of the piece 20 is sufficient to lend rigidity thereto vertically. Vibrations occurring in a combination of the two directions are therefore admirably cared for.

It will be obvious that various changes may be made in the arrangement, combinations and construction of the various parts of my improved device, without departing from the spirit of my invention and it is my intension to cover by my claims such changes as may be reasonably included within the scope thereof.

What I claim is:

1. In a motor vehicle, the combination of an automobile body having a dash, an engine, an angle plate having one side thereof secured to the top of said engine and the other side extending upward and parallel to said dash, a plate, a friction lining attached to said plate and means projecting from said angle plate adapted to press said lining against said dash.

2. In a motor vehicle, the combination of an automobile body having a dash, an engine mounted on cushioning means, an angle plate having one side thereof secured to the top of said engine and the other side extending upward and parallel to said dash, a plate, friction lining secured to said plate, bolts through said angle plate and adapted to position and press said lining against said dash, and means for normally holding said bolts against turning.

3. In a motor vehicle, the combination of an automobile body having a dash, an engine mounted in rubber blocks, an angle plate having one side thereof secured to the top of said motor and the other side extending up parallel to said dash, a plate having a seat cut therein, a friction lining attached to said plate, bolts threaded through said angle plate having their ends positioned in the seat in said plate to press the lining against said dash and nuts on said bolts adapted to keep the same from normally rotating and to hold said plate under a spring tension.

CARL BREER.